United States Patent
Han et al.

(10) Patent No.: US 7,701,666 B2
(45) Date of Patent: Apr. 20, 2010

(54) PERPENDICULAR MAGNETIC RECORDING WRITE HEAD WITH A SELF ALIGNED STITCHED WRITE SHIELD

(75) Inventors: Cherng-Chyi Han, Milpitas, CA (US); Kenichi Takano, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/001,350

(22) Filed: Dec. 11, 2007

(65) Prior Publication Data
US 2008/0094750 A1      Apr. 24, 2008

Related U.S. Application Data

(63) Continuation of application No. 10/849,312, filed on May 19, 2004, now Pat. No. 7,307,815.

(51) Int. Cl.
*G11B 5/17* (2006.01)
(52) U.S. Cl. .................................................. 360/123.1
(58) Field of Classification Search ........................ None
See application file for complete search history.

(56) References Cited

U.S. PATENT DOCUMENTS

| | | | |
|---|---|---|---|
| 5,075,956 A | 12/1991 | Das | |
| 6,128,166 A | 10/2000 | Tanaka et al. | |
| 6,278,591 B1 | 8/2001 | Chang et al. | |
| 6,591,480 B1 | 7/2003 | Chen et al. | |
| 6,884,730 B2 | 4/2005 | Sasaki et al. | |
| 7,221,539 B2 | 5/2007 | Takano et al. | |
| 7,307,815 B2 * | 12/2007 | Han et al. | 360/123.02 |
| 7,363,700 B2 | 4/2008 | Matono | |
| 7,492,551 B2 | 2/2009 | Matono | |
| 2002/0071208 A1 | 6/2002 | Batra et al. | |

FOREIGN PATENT DOCUMENTS

| | | |
|---|---|---|
| JP | 08-147625 | 6/1996 |
| JP | 2001-250204 | 9/2001 |
| JP | 2002-092820 | 3/2002 |

\* cited by examiner

*Primary Examiner*—David D Davis
(74) *Attorney, Agent, or Firm*—Saile Ackerman LLC; Stephen B. Ackerman

(57) ABSTRACT

A perpendicular magnetic recording (PMR) head with single or double coil layers has a small write shield stitched onto a main write shield. The stitched shield allows the main write pole to produce a vertical write field with sharp vertical gradients that is reduced on both sides of the write pole so that adjacent track erasures are eliminated. From a fabrication point of view, both the main pole and the stitched shield are defined and formed using a single photolithographic process, a trim mask and CMP lapping process so that the main shield can be stitched onto a self-aligned main pole and stitched shield.

6 Claims, 6 Drawing Sheets

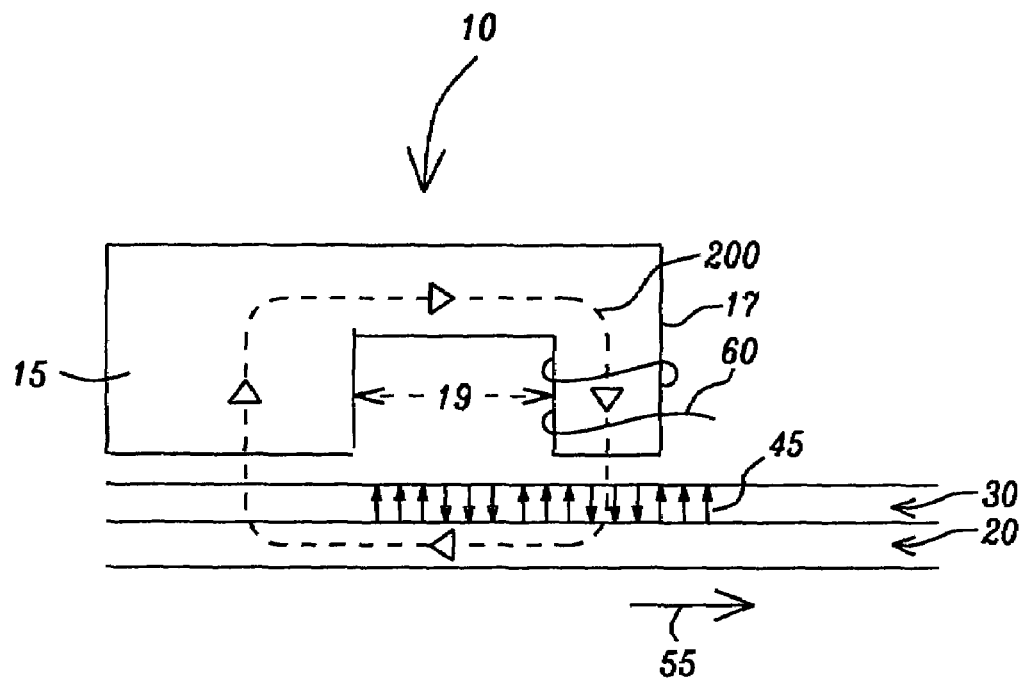
*FIG. 1 – Prior Art*
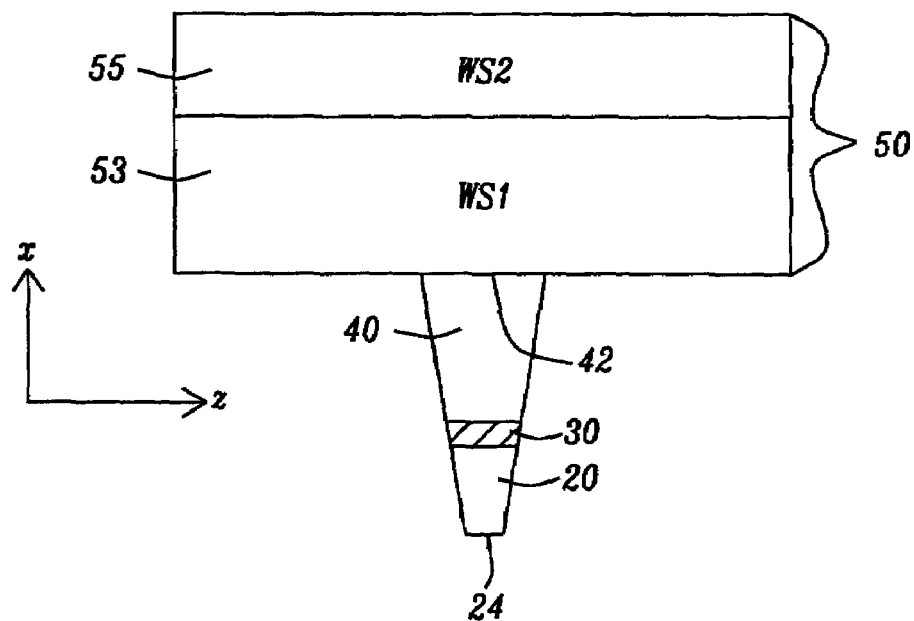
*FIG. 2a*

PERPENDICULAR MAGNETIC RECORDING WRITE HEAD WITH A SELF ALIGNED STITCHED WRITE SHIELD

RELATED APPLICATION

This is a Divisional Application of U.S. patent application Ser. No. U.S. 10/839,312, filed on May 19, 2004 now issued as U.S. Pat. No. 7,307,815, which is herein incorporated by reference in its entirety, and assigned to a common assignee.

BACKGROUND OF THE INVENTION

1. Field of the Invention

This invention relates generally to the design of magnetic recording heads for high recording density, particularly heads designed for perpendicular magnetic recording 2. Description of the Related Art The commonly used inductive magnetic write head technology utilizes the longitudinal configuration. In this configuration a magnetic field fringes across a write gap between an upper and a lower pole in the plane of the air bearing surface (ABS) of the write head. This plane will be referred to as the longitudinal plane. The ABS is positioned above and parallel to the surface of a recording medium, such as a hard disk. The surface of the hard disk is formed of a magnetic medium. As the hard disk moves beneath the ABS, a horizontal component of the fringing field of the write head interacts with and aligns regions of sharp magnetic transitions (essentially magnetic domains) which are horizontally disposed within the surface of the magnetic medium.

Perpendicular magnetic recording (PMR) offers a new writing configuration that is a viable replacement candidate for the horizontal configuration as recording area densities approach 500 Gb/in$^2$. At this ultra-high area density, the super-paramagnetic limit of magnetic media becomes a problem, which is the condition wherein magnetic domains are so small that they lack thermal stability and can be randomly aligned by thermal agitation.

As is well explained by Tanaka et al. (U.S. Pat. No. 6,128,166) and also by Batra et al. (U.S. Patent Application Publication No.: US 2002/0071208 A1), in perpendicular recording, the magnetic recording medium is formed in two layers, an upper layer formed vertically over a lower layer. The lower layer is formed of soft magnetic material. An upper layer has a high coercivity (it is a hard magnetic material) and a vertical magnetic anisotropy, ie an anisotropy that is perpendicular to the surface plane of the recording medium. The soft magnetic lower layer acts to concentrate the field produced by the write head. This configuration has the potential to support much higher recording densities due to a reduced demagnetization field required to induce sharp magnetic transitions during the recording process. The fringing field across the write gap of the write head then interacts with the vertical anisotropy of the upper layer with a perpendicular field component and its gradient, rather than a horizontal component, and produces sharp transitions therein. The vertical transitions in the perpendicular recording medium are more stable thermally due, in part, to a thicker upper layer, so the super-paramagnetic limits is no longer as significant a problem it is in longitudinally anisotropic media.

The design of a perpendicular magnetic recording (PMR) head offers new challenges, since it must provide a writing field of extremely high definition and sharp field gradient, compatible with the increased area density of the medium and its correspondingly narrower track widths. Batra et al. (cited above) shows the basic design and operation of a perpendicular write head of the prior art, which is shown also in our FIG. 1. Referring to FIG. 1, there is shown schematically a side cross-sectional view of a particularly simplified write head (10), its magnetic field (200) and a magnetic medium moving beneath it. The magnetic medium has two layers, a lower soft layer (20) and an upper hard layer (30) with vertically oriented magnetic domains (arrows(45)). The medium is moving from right to left, as shown by the arrow (55). The pole structure of the write head includes a return (lower) pole (15) and a main writing (upper) pole (17) with a gap between them (19). An induction coil (60) is wound around the pole to produce the magnetic field (shown by closed field lines (200). The field emerges from the main pole and returns through the lower pole. Batra et al. note that the write head illustrated will create problems of unwanted side writing because of the lack of a shielding mechanism to contain the field laterally and prevent the field from spreading beyond the track being written upon. Batra, therefore, teaches a write head in which there are two return poles and a central write pole formed between them, wherein side shields are formed on either side of the poles.

More traditional longitudinal write heads have also had to deal with problems associated with narrow tracks, such as unwanted side writing (writing on tracks adjacent to the actual track being written on). One approach is taught by Chang et al. (U.S. Pat. No. 6,278,591 B1), which is to form the pole with an inverted head. Das (U.S. Pat. No. 5,075,956) teaches a write head in which the pole tip is surrounded on either side by shields that contain unwanted flux spreading. Another approach to producing such write heads with narrow pole tips and correspondingly highly defined write gaps has been the stitched pole write head. This design permits the pole tip to be formed separately, whereby its shape and dimensions can be carefully controlled, then "stitched" or plated onto a larger pole piece. Chen et al. (U.S. Pat. No. 6,591,480 B1) teaches a process for forming a stitched longitudinal write head with a narrow pole tip in which the magnetic flux across the write gap is concentrated by a dielectric-filled gap in the lower pole piece.

The purpose of the present invention is to provide a method of manufacturing a shielded perpendicular write head that effectively eliminates adjacent track erasure (ATE) by concentrating the writing field at the position of the track being written upon and thereby effectively shielding the writing field from laterally displaced regions. More specifically, we propose a method of forming the shields using a self-aligned stitching procedure that takes advantage of stringent controls on photolithographic processing for achieving track width and throat height tolerances.

SUMMARY OF THE INVENTION

A first object of this invention is to provide a method of forming a perpendicular magnetic recording (PMR) head that significantly reduces unwanted side writing and adjacent track erasure (ATE) as compared to conventional designs.

A second object of the invention is to provide a method for producing a PMR head which includes a write shield (WS) and a self-aligned stitched write shield (SWS).

A third object of the present invention is to provide a method of producing a PMR head in which the stitched write shield (SWS) and the main pole (MP) are defined in a single and efficient photolithographic process and lap-back by chemical mechanical processing (CMP), thereby enabling the critical dimensions of the pole tip and stitched shield to be accurately and reliably defined.

A fourth object of the present invention is to provide a method of forming a stitched shield PMR head with improved throat height definition and improved tolerances in other critical dimensions.

A fifth object of the present invention is to provide a method of forming a PMR head with reduced flux leakage between the main pole (MP) and the write shield (WS).

A sixth object of the present invention is to provide a method for forming a PMR head with an improved perpendicular writing field component and improved perpendicular writing field gradient.

A seventh object is to provide the write head so formed in both a single and double inductive coil configuration.

These objects will be achieved by a novel PMR head design in which there is a main pole piece, a write gap above the main pole piece, and a novel shield formation above the write gap. The novel shield formation comprises a large main write shield and an additional smaller shield that is stitched onto the main shield, between that main shield and the write gap. An equally novel fabrication method shapes the stitched shield and tip of the main pole using a single self-aligned photolithographic process that allows the extremely narrow shape of both elements to be accurately and reliably formed.

Referring to FIG. 2a, there is shown schematically a front view of the air bearing surface plane (ABS) of the present invention. The main pole (20) has a truncated wedge shape of narrow dimension. The write gap layer (30) is formed above the main pole. The stitched write shield (40), which also has a truncated wedge shape is formed above the write gap and is stitched onto the main write shield (50), which is actually formed in two parts, briefly denoted WS1 (53) and WS2 (55). The dimensions of (20), (30) and (40) will be given below. Axes, labeled x, z indicate directions along a recording track (x) and transverse to recordings tracks (z). The movement of a recording medium (a disk) relative to the drawing is bottom to top (x direction), so any given region of the medium passes the main shield last and the write pole first. The edge that is first passed by a portion of the moving medium is called its leading edge, the edge last passed is the trailing edge. Thus, the trailing edge of the stitched pole (42) is stitched onto the leading edge of WS1 (53).

Referring next to FIG. 2b, there is shown a cross-sectional side view of the present invention taken through a central line bisecting the front view of FIG. 2a. For simplicity, the configuration shown is a single coil configuration preferred embodiment, but a double coil configuration will also be described as a preferred embodiment. The figure schematically reveals the vertical cross-sectional shape of the main pole (20), the write gap layer (30), the stitched pole piece (40) and the two parts of the main write shield, WS1 (53) and WS2 (55). A small portion of a trim mask (100), whose use will be more fully explained below, may remain. The stitched pole is formed on the leading edge of (53). It is seen that (55) forms an overarching yoke that completes the magnetic flux circuit with the main pole (20) by connecting with a back-gap region (57). An insulated coil structure is shown situated below (55), the coils being shown with substantially rectangular cross-section (64). An alumina insulating layer (66) surrounds the coils and additional insulation (68) fills the spaces between the coils. It is understood that the coils are wound continuously around the back-gap portion (57) and pass behind the figure. This part of the coil is not shown in the figure. The magnetic write field would normally emerge from the pole (20) and return into the shield (40 and 53)). The flux density is greatest at the returning flux entering the stitched write shield (40). The density diminishes substantially to either lateral side of the shield (z-direction in FIG. 1, out of the figure plane in this figure) as will be indicated in subsequent graphs. The lateral diminution of field flux is what significantly reduces or eliminates adjacent side erasures provided by the invention.

The efficacy of the configuration shown in FIGS. 2a and b can be inferred from measurements taken of the writing field produced by the configuration along the x-direction of the track being written upon. FIGS. 3a-3c show a graphical representation of the perpendicular component (y-component) of the writing field, $H_y$, as a function of distance, in microns, along the x direction on the track, for an unshielded single pole (3a), a shielded pole (3b) and a stitched shielded pole (3c). In FIG. 3a, the pole is between approximately 0.1 and 0.4 microns. In FIGS. 3b and 3c, the shield is between approximately −2.3 and 0 microns, and the main pole is located between approximately 0.1 and 0.4 microns. In the stitched shielded case, the locations of the main pole, stitched shield and main shield are, respectively, between approximately 0.1 and 0.4 microns, between approximately −0.3 and 0 microns and between approximately −2.3 and −0.3 microns.

As can be seen from the shape of the graphs, the stitched pole produces maximum field gradients.

BRIEF DESCRIPTION OF THE DRAWINGS

FIG. 1 is a schematic cross-sectional view of a prior-art PMR head and its write field.

FIGS. 2a-b are schematic views, shown in the ABS plane (2a) and in vertical cross-section (2b), of one embodiment (single coil) of the present invention.

DESCRIPTION OF THE PREFERRED EMBODIMENTS

First Preferred Embodiment: Double Coil

The present invention, in a first preferred embodiment, is a method of fabricating a double coil perpendicular magnetic write head having a stitched write shield formed between a write gap layer and a main write shield. The fabrication consists of an upper and a lower portion, the lower portion containing a lower conducting coil layer which is finally connected to an upper coil layer in the upper portion. The upper portion, which is formed on the lower portion, contains the main pole as its lowest layer, an upper coil layer formed over the main pole, and a yoke which overarches the upper coil, and connects a rear portion of the main pole to a main write shield in the ABS plane.

Figure 4A:
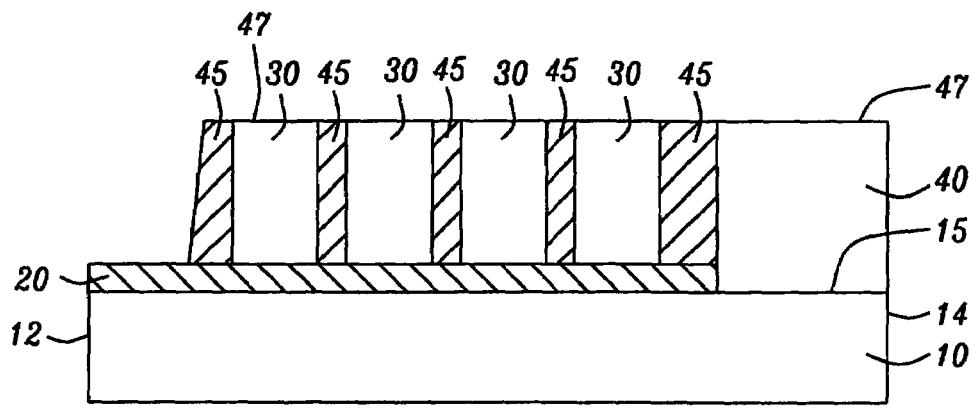
FIGS. 4a-g are schematic cross-sectional views of various stages in the fabrication of a double coil embodiment of the present invention. The figures are also referred to in reference to a single coil embodiment.

Referring first to FIG. 4a, there is shown a substrate (10) for the fabrication, which is typically a shield layer that may serve as a bottom shield for the write head of the present invention and/or as an upper shield for a read head that may be positioned beneath the write head. The read head is not shown, but such positioning is well known in the art. The shield layer has a front vertical edge surface (12), which will be co-planar with the air-bearing surface (ABS) of the completed fabrication, and a rear vertical edge surface (14). On the shield layer there is then formed a coil patch layer (20), which extends from the front surface of the shield (12) but does reach the rear edge (14) and thereby leaves a portion of an upper surface of the shield layer temporarily exposed (15). This patch layer, which is preferably a layer of alumina, will insulate a lower inductive coil layer from the shield layer. A lower coil layer (30) is formed on the patch layer, the coil being a continuous spirally wound conducting layer with substantially rectangular cross-section. It is understood that the nature of the coil shape requires that a portion of the coil extend beyond the rear edge of the shield layer, but that portion is not shown in the figure. A back-gap layer (40), formed of the lower shield layer material, is then formed on the exposed surface portion (15) of the lower shield layer. This back-gap portion is substantially of height equal to the height of the coil layer. The spaces between the coil windings are then filled with an insulating material (45), preferably the same material as the coil patch layer, and an upper surface (47) of the back-gap layer, the coil layer and the insulating fill is smoothed and rendered planar by a process of chemical mechanical polishing (CMP).

Figure 4B:
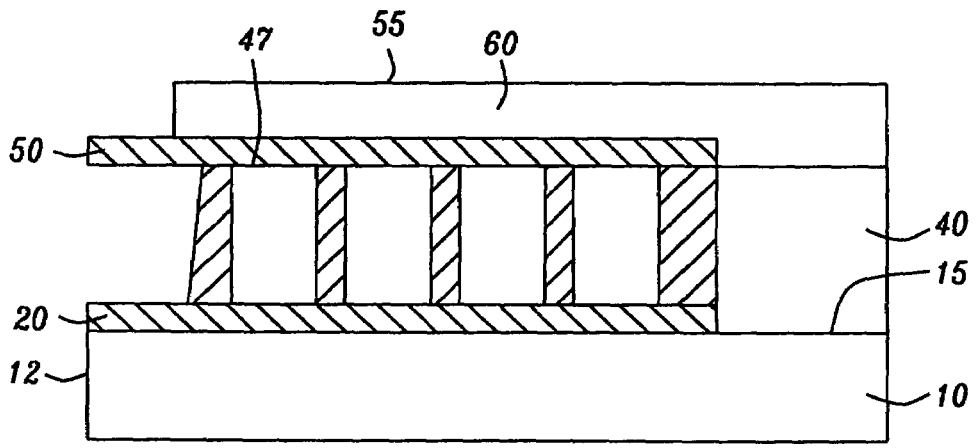

Referring next to FIG. 4b, there is shown the fabrication of FIG. 4a wherein a second insulating coil patch layer (50), preferably a layer of alumina, is then formed on the planar surface (47). This second coil patch layer forms an insulating layer on the upper surface of the lower coil layer and it extends rearward from the ABS and is of equal extent as the first coil patch layer (20). A flux-enhancing bottom yoke (60) is then formed over the patch layer (50) and has its upper surface (55) rendered planar by a process of CMP. This completes the formation of the bottom portion of the write head.

Figure 4C:
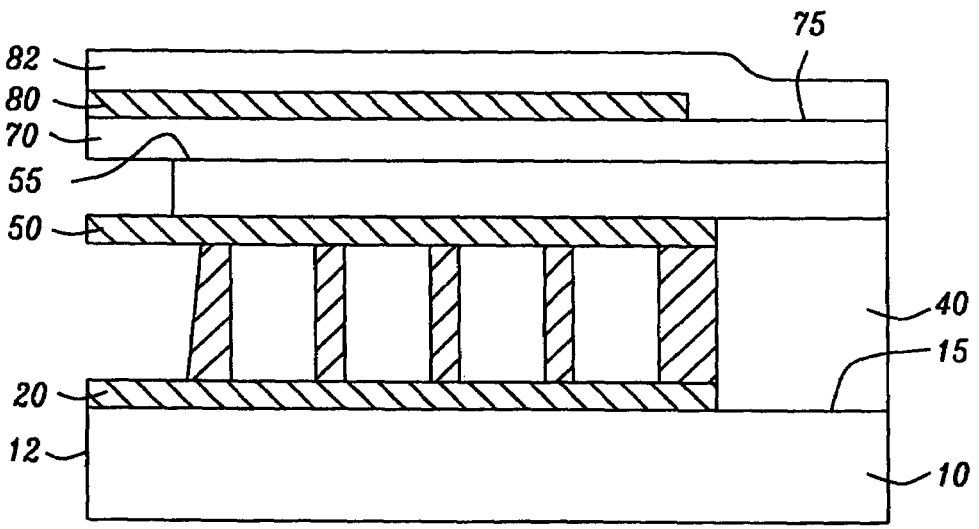

Referring next to FIG. 4c, there is shown the first step in the formation of the upper portion of the write head. There is shown first the fabrication of FIG. 4b whereon a main pole (70) is formed on the planar surface (55) of the bottom yoke layer. The main pole layer is formed of a magnetic material such as CoFeN, CoNiFe, FeNi or CoFe and is formed to a thickness between approximately 0.2 and 0.4 microns.

A write gap layer (80), which is a layer of insulating material such as alumina, formed to a thickness between approximately 300 and 1000 angstroms is then formed over the main pole layer. The write gap layer extends rearward from the front ABS plane, but does not completely cover the main pole layer. A rear portion of the main pole layer (75) remains uncovered and will serve to form the base of a rear back-gap connection to an overarching yoke and write shield layer.

Still referring to FIG. 4c, there is shown a layer (82), which will be patterned to form the stitched shield, that is formed over the write gap layer and the rear portion of the main pole layer (75). The stitched shield layer is a layer of CoFeN or CoNiFe, formed to a thickness between approximately 0.2 and 0.5 microns.

Figure 4D:
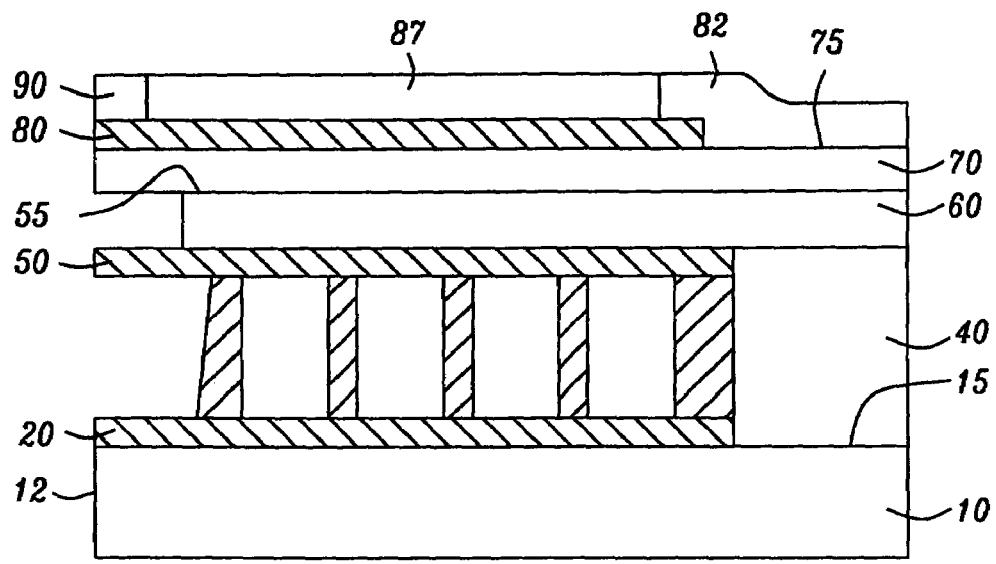

FIG. 4d now shows that a portion of the layer (82) has been removed by an etching process such as an ion-beam etch used in conjunction with a photolithographic lift-off stencil that is well known in the art and the removed portion has been refilled by a layer (87) of non-magnetic material such as Ru. A front portion (90) of the stitched shield layer remains and, when subsequently trimmed and shaped, will form the stitched shield of the invention. A rear portion, still labeled (82) will be a part of the back-gap connection to the overarching yoke.

Figure 4E:
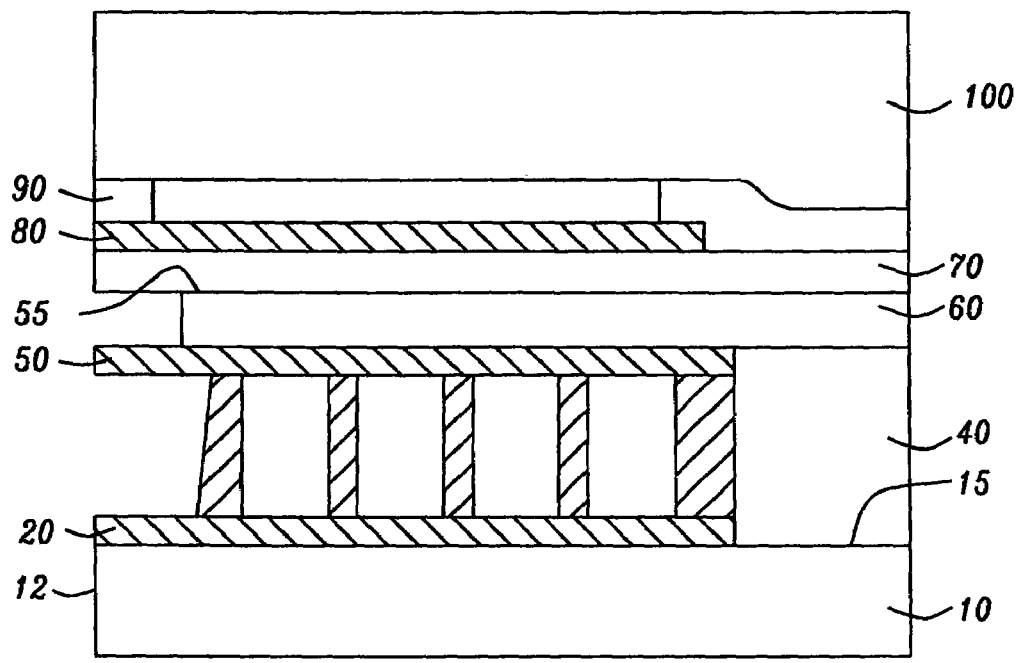

Referring now to FIG. 4e, there is then shown the formation of a plated CoNiFe trim mask (100) that will be used in conjunction with an angled ion beam to simultaneously shape the stitched shield (90), the write gap (80) and the main pole (70) into the tapered form that is shown, in a front, ABS plane view, in FIG. 2a.

As a result of the shaping process, the stitched shield and pole are formed, cross-sectionally in the ABS plane, as truncated wedges, with gradual tapers. The approximate dimensions of the cross-sectional shapes are as follows: stitched shield (90): width, between approximately 0.1 and 0.2 microns, height, between approximately 0.2 and 0.4 microns; main pole (70): width, between approximately 0.1 and 0.2 microns, height, between approximately 0.2 and 0.4 microns; gap (80) thickness, between approximately 300 and 1000 angstroms.

Figure 4F:
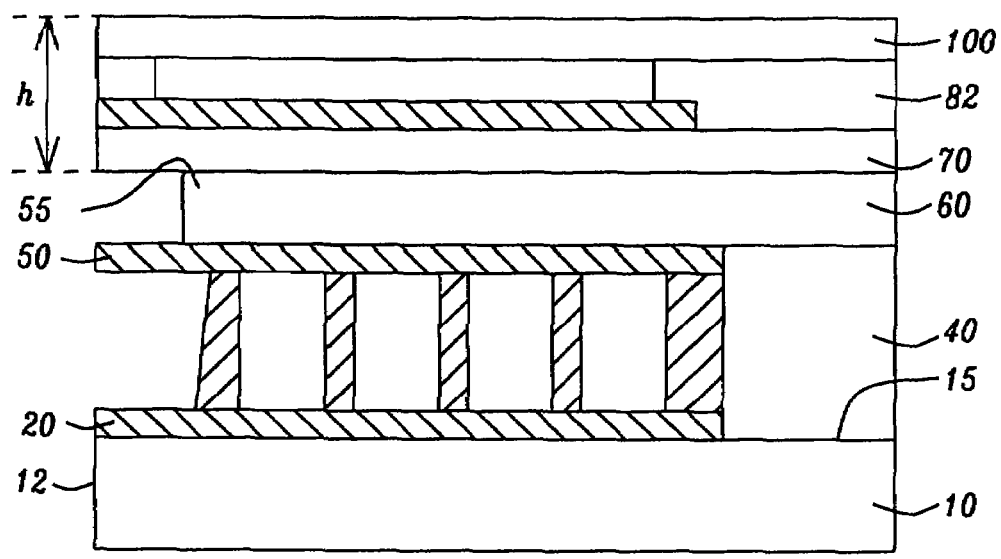

Referring to FIG. 4f, there is shown the fabrication of FIG. 4d wherein the thickness of the trim mask (100) has been reduced by CMP so that the total final thickness, h, of the main pole (70), the write gap (80), the stitched pole (90) and thinned trim mask (100) is between approximately 0.7 and 1.0 microns.

Figure 4G:
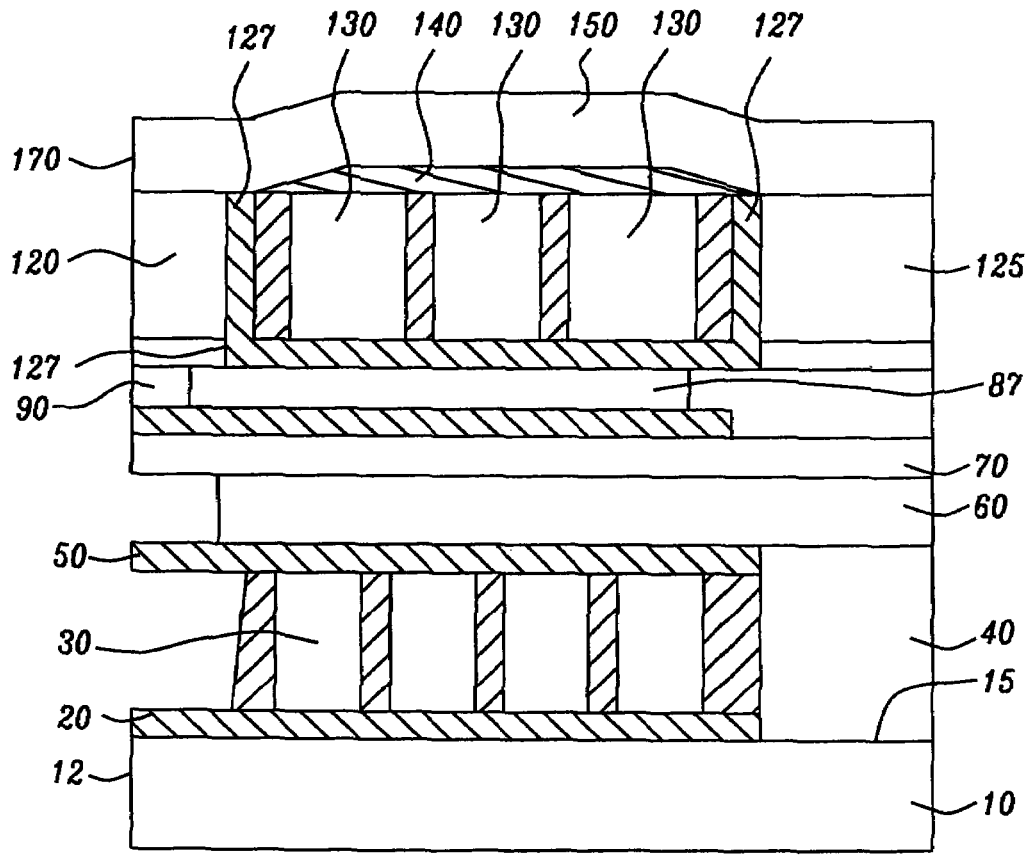

Referring to FIG. 4g, there is shown the formation of an upper shield layer that is patterned so that it has a front (120) portion and a rear (125) portion. The rear portion will be a part of the rear connection to the overarching yoke. A layer of alumina insulation (127) is then formed to conformally cover the inner surfaces of the front and rear portions of the upper shield layer and the upper surface of the refill layer (87). Within this layer covered region, there is now formed an upper coil layer (130) that is conductively connected to the lower coil layer (30) to form a continuous inductive coil. The connection between upper and lower coils is not shown in the figure and is not a part of the novelty of the invention. A layer of insulation (140) is now formed over the coil and between its layers. Finally, the write head fabrication is completed by the formation of an overarching upper yoke (150) that serves to connect the front (120) and rear (125) portions of the upper shield layer, forming thereby a closed magnetic circuit with the main pole (70). The front vertical surface of the yoking layer (170) within the ABS plane also serves as a part of the upper shield layer. This yoking layer is formed of CoNiFe to a thickness between approximately 0.5 and 1.5 microns.

Second Preferred Embodiment: Single Coil

The present invention, in a second preferred embodiment, is a method of fabricating a single coil perpendicular magnetic write head having a stitched write shield formed between a write gap layer and a main write shield. The formation of this embodiment follows exactly the steps in the formation of the upper portion of the first preferred embodiment, wherein all the steps in the formation of the lower portion of the write head are omitted. The fabrication process can be understood by referring to FIG. 2b, which shows the completed invention, and to the steps disclosed in discussing FIGS. 4c-4f, which shows the steps involved in completing the upper portion of the first embodiment. In short, the second embodiment begins with the formation of a bottom yoke layer ((60) in FIGS. 2b and 4b) and proceeds from that point in a manner identical to the formation of the second portion of the write head in the first embodiment. The following discussion will be briefer than the discussion incident to the explanation of FIGS. 4a-g, since all steps can be understood from that previous discussion.

Figure 2B:
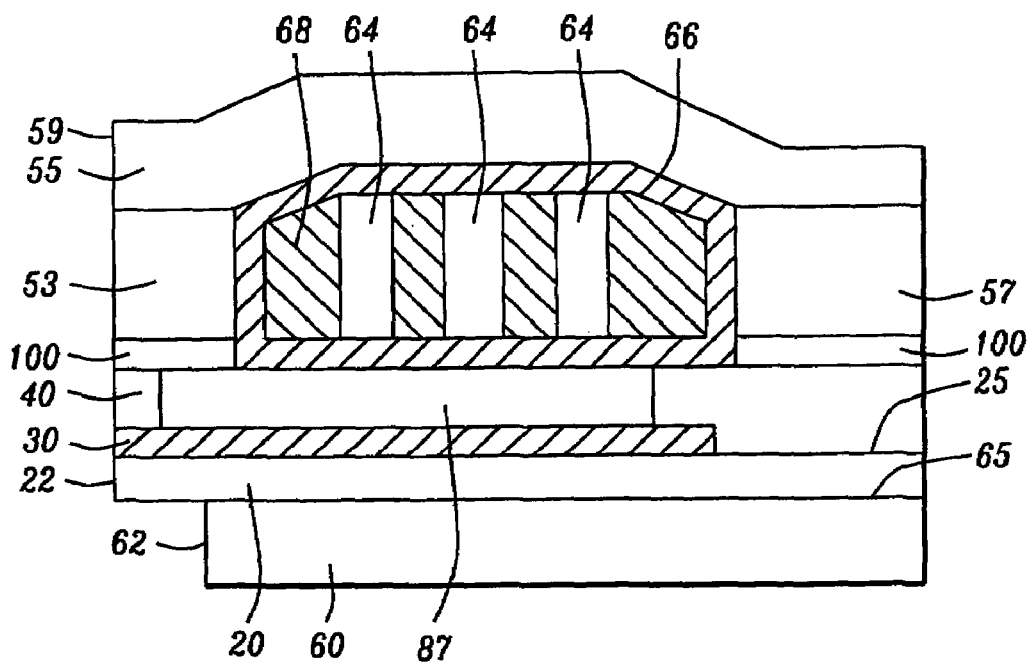
Figure 3A:
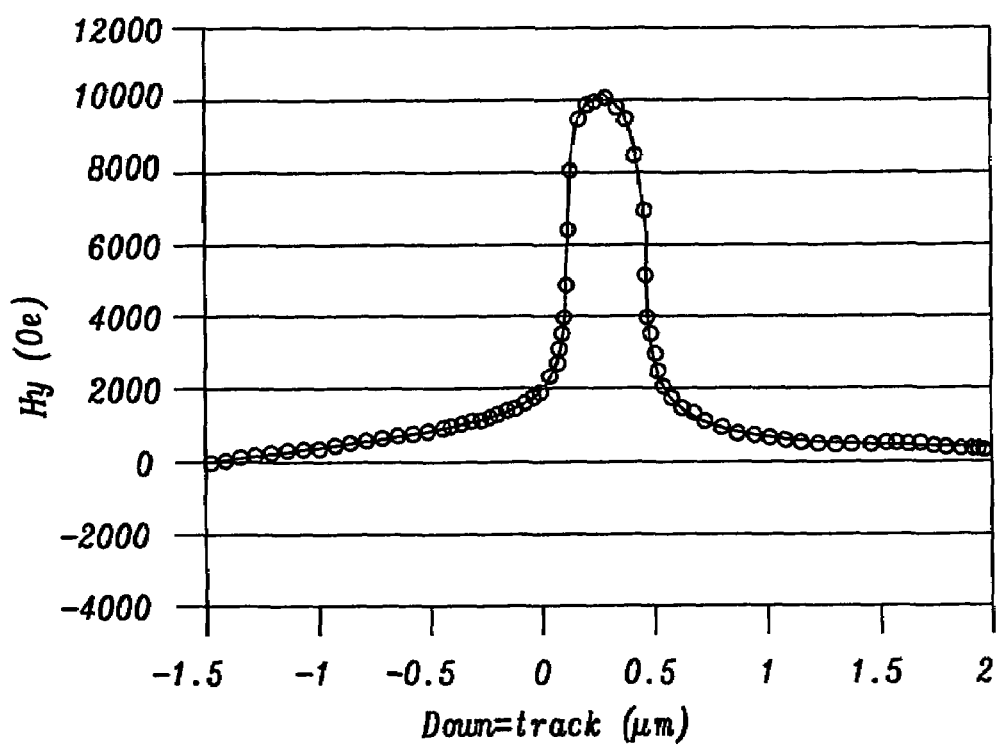
FIGS. 3a-c are graphs of the vertical write field component of unshielded (3a), shielded (3b) and stitch-shielded (3c) write heads.
Figure 3B:
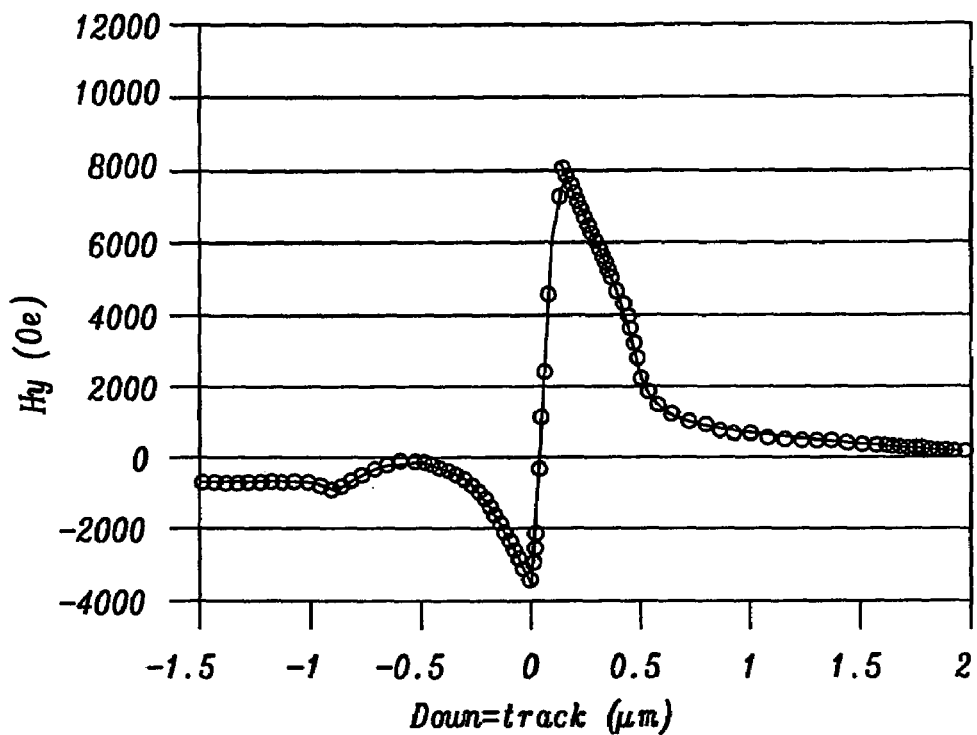
Figure 3C:
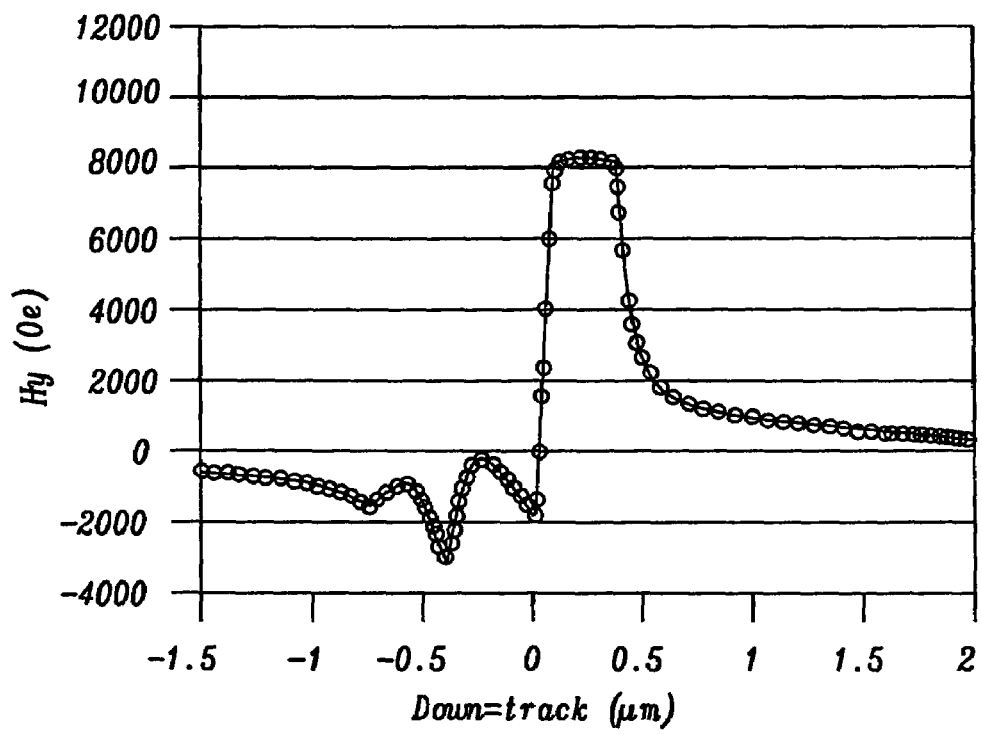

Referring, then, to the final fabrication shown in FIG. 2b, there is shown the formation of a bottom yoke layer (60), which can be a layer of CoNiFe, formed to a thickness between approximately 0.3 and 1.0 microns. A main pole (20) is formed on a planar surface (65) of the bottom yoke layer. The main pole layer is formed of a magnetic material such as CoFeN, CoNiFe, FeNi or CoFe and is formed to a thickness between approximately 0.2 and 0.4 microns. The front edge (22) of the main pole layer extends beyond the front edge of the yoke layer (62), the edge of the main pole extending to what will become the ABS plane of the write head.

A write gap layer (30), which is a layer of insulating material such as alumina, formed to a thickness between approximately 300 and 1000 angstroms, is then formed over the main pole layer. The write gap layer extends rearward from the front ABS plane, but does not completely cover the main pole layer. A rear portion of the main pole layer (25) remains uncovered.

The stitched shield (40), is formed over the write gap layer by patterning a larger layer formed on the main pole layer as described in FIGS. 4c and 4d. The stitched shield layer is a layer of CoNiFe or CoFeN, formed to a thickness between approximately 0.2 and 0.5 microns.

The patterning of the stitched shield layer requires removal of a portion of the layer by an etching process such as an ion-beam etch and the refilling of the removed portion by a layer (87) of non-magnetic material such as Ru. A front portion (40) of the stitched shield layer remains and forms the stitched shield of the invention.

A trim mask, as described and shown in FIG. 4e, will be used to simultaneously shape the stitched shield (40), the write gap (30) and the main pole (20) into the form that is shown, in a front, ABS plane view, in FIG. 2a.

Subsequent to the shaping of the stitched shield, the write gap and the pole, the height of the trim mask is reduced by CMP so that the total height, h, of the main pole (20), the write gap (30), the stitched pole (40 and remaining portions of the trim mask (100) is between approximately 0.7 and 1.0 microns.

Finally, there is shown the an upper shield layer that is patterned so that it has a front (53) portion and a rear (57) portion. A layer of alumina insulation (66) is formed to conformally cover the inner surfaces of the front and rear portions of the upper shield layer and the upper surface of the refill layer (87). Within this alumina layer covered region, there is now formed a coil layer (64) that is a single coil layer. A layer of insulation (68) is now formed over the coil and between its layers. Finally, the write head fabrication is completed by the formation of an overarching yoke (55) that connects the front (53) and rear (57) portions of the upper shield layer. This yoking layer is formed of CoNiFe to a thickness between approximately 0.5 and 1.5 microns. The vertical front edge (59) of (55) is coplanar with the ABS surface of the fabrication.

As is understood by a person skilled in the art, the preferred embodiments of the present invention are illustrative of the present invention rather than limiting of the present invention. Revisions and modifications may be made to methods, materials, structures and dimensions employed in a method for forming and providing a perpendicular magnetic recording head having a self-aligned stitched write shield, while providing such a device and its method of formation in accord with the spirit and scope of the present invention as defined by the appended claims.

What is claimed is:

1. A double coil perpendicular magnetic recording (PMR) head with a stitched write shield and a vertical planar air-bearing surface (ABS) comprising:
    a lower write head portion enclosing a lower coil layer;
    an upper write head portion formed on said lower portion, enclosing an upper coil layer, and further comprising:
        a main pole, having a vertical planar front surface in the ABS plane of the write head;
        a main write shield, formed above said main pole, having a vertical planar front surface in the ABS plane of the write head;
        a stitched write shield, formed centrally and symmetrically on a lower surface of said main write shield, extending between said main write shield and said pole but separated from said pole by a gap, said stitched write shield having a vertical planar front surface in the ABS plane of said write head;
        an overarching yoke connecting said main write shield to a rear portion of the main pole, creating, thereby, a continuous magnetic connection between said stitched shield, said main write shield and said main pole.

2. The write head of claim 1 wherein the ABS planar surface of said stitched shield and said main pole is shaped as a truncated wedge, said stitched shield having a width between approximately 0.1 and 0.2 microns, a height between approximately 0.2 and 0.4 microns, said main pole having a width between approximately 0.1 and 0.2 microns and a height between approximately 0.2 and 0.4 microns and said gap having a thickness between approximately 300 and 1000 angstroms.

3. The write head of claim 1 wherein said main pole is formed of the magnetic material CoFeN, CoNiFe, FeNi or CoFe.

4. The write head of claim 1 wherein said gap is formed of a layer of alumina.

5. The write head of claim 1 wherein said stitched shield is formed of a layer of CoFeNi or a layer of CoFeN.

6. The write head of claim 1 wherein said yoke is formed of CoNiFe.

* * * * *

UNITED STATES PATENT AND TRADEMARK OFFICE
CERTIFICATE OF CORRECTION

PATENT NO. : 7,701,666 B2
APPLICATION NO. : 12/001350
DATED : April 20, 2010
INVENTOR(S) : Cherng-Chyi Han and Kenichi Takano It is certified that error appears in the above-identified patent and that said Letters Patent is hereby corrected as shown below:

Title Page
In the Related U.S. Application data (63), delete "Continuation of application No. 10/849,312 filed on May 19, 2004, now Pat. No. 7,307,815" and replace with -- Divisional of application No. 10/849,312, filed on May 19, 2004, now Pat. No. 7,307,815 --.

Signed and Sealed this

Fourteenth Day of September, 2010

David J. Kappos
*Director of the United States Patent and Trademark Office*